July 20, 1937. H. W. PITT 2,087,548
SHOCK ABSORBER FOR MOTOR VEHICLES
Filed May 12, 1936 3 Sheets-Sheet 1

July 20, 1937.	H. W. PITT	2,087,548
SHOCK ABSORBER FOR MOTOR VEHICLES
Filed May 12, 1936	3 Sheets-Sheet 2

INVENTOR:
H. W. Pitt
By: Hascock Downing & Seebold
Attys

July 20, 1937. H. W. PITT 2,087,548
SHOCK ABSORBER FOR MOTOR VEHICLES
Filed May 12, 1936 3 Sheets-Sheet 3

INVENTOR:
H. W. Pitt
By: Glascock Downing & Seebold
Attys.

Patented July 20, 1937

2,087,548

UNITED STATES PATENT OFFICE 2,087,548

SHOCK ABSORBER FOR MOTOR VEHICLES

Herbert Winchester Pitt, Birmingham, England, assignor to Joseph Lucas Limited, Birmingham, England Application May 12, 1936, Serial No. 79,343
In Great Britain May 18, 1935

3 Claims. (Cl. 188—89)

This invention relates to fluid controlled shock absorbers for motor vehicles, and has for its object to provide improved means whereby the action of such absorbers can be readily adjusted to suit differing road conditions.

In the three accompanying sheets of explanatory drawings:—

Figure 1:
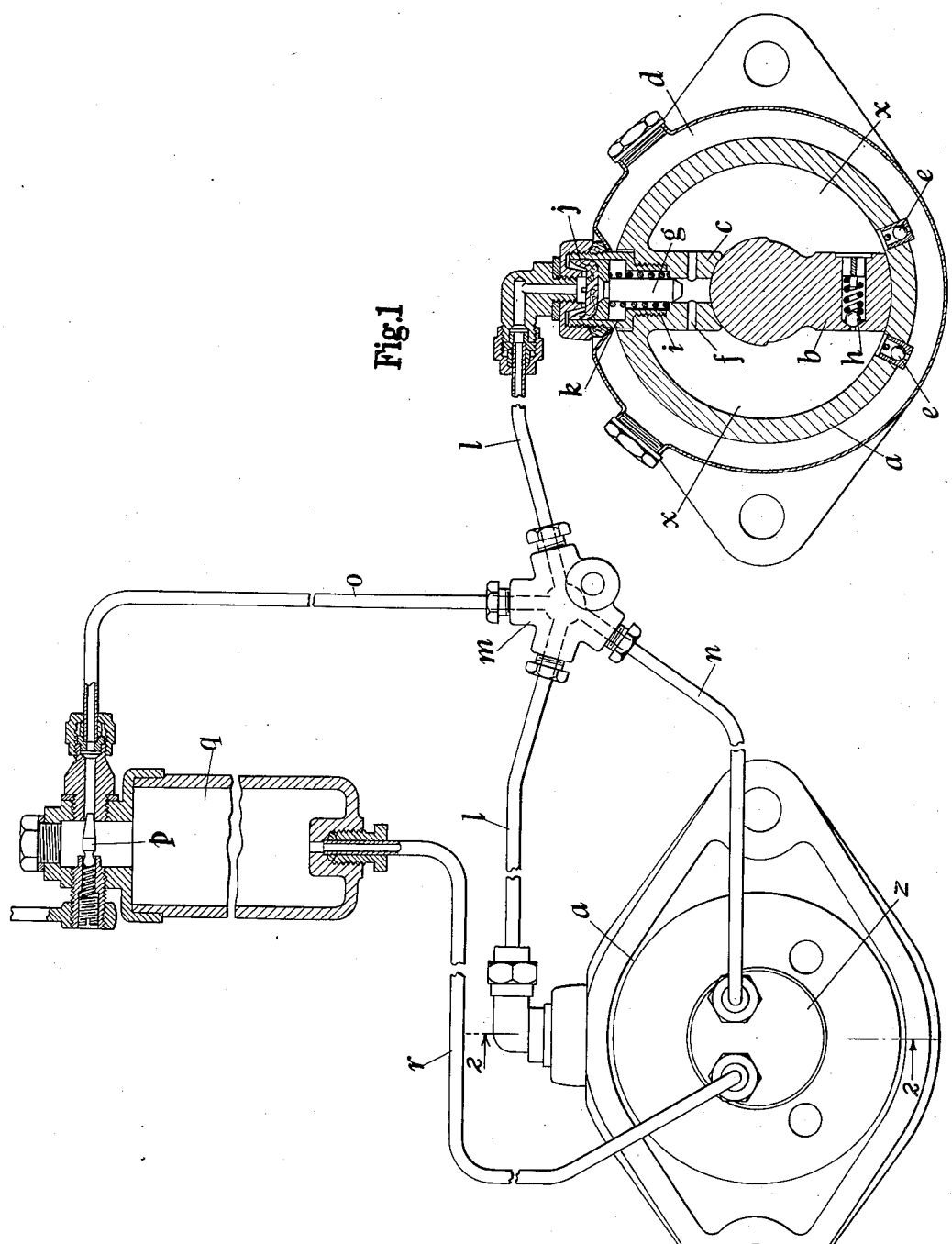
Figure 1 is a part sectional elevation illustrating a shock absorber system provided with this invention.
Figure 2:
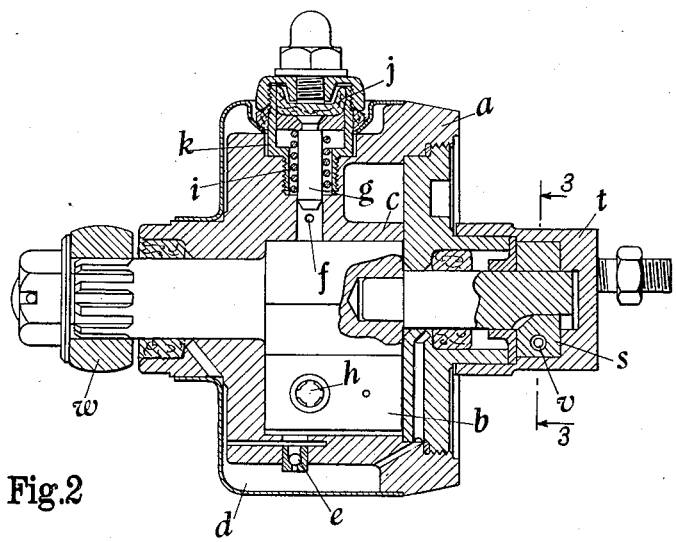
Figure 2 is a vertical longitudinal sectional view on the line 2—2, Figure 1, of one of the shock absorbers.

In carrying the invention into effect as shown in Figures 1 and 2, I employ a shock absorber in association with each road wheel of the vehicle. Two such absorbers are shown in Figure 1. For a four-wheel vehicle four shock absorbers would be used. Each comprises a cylindrical body part $a$ containing an oscillatory vane $b$ the latter being adapted at one end to co-operate with a fixed abutment $c$ in the body part, and at the other end with the inner cylindrical surface of the body part. Around the body part is arranged a replenishing chamber $d$ by which the supply of oil or other liquid is maintained in the chambers at either side of the vane through non-return valves $e$. These chambers $x$ are interconnected by a passage $f$ through the abutment, and this passage is controlled by an adjustable valve $g$. Also the vane may be provided with a passage interconnecting the chambers and controlled by a non-return valve $h$.

The valve $g$ is moved in the direction for opening the passage $f$ by a spring $i$, and in the direction for closing the passage by fluid pressure acting on a piston $j$ at one end of the valve. The cylindrical chamber $k$ which contains the piston and which may be carried adjustably on the body part $a$ is connected by a pipe $l$ to a junction fitting $m$ to which the said pipes $l$ of all the shock absorbers are connected. Further this fitting is connected by a pipe $n$ to the delivery side of a pump $z$, and by a pipe $o$ to a hand operated regulating valve $p$ associated with a reservoir $q$, this latter being connected by a pipe $r$ to the suction side of the pump.

In this example the pump is combined with one of the shock absorbers as shown in Figure 2 and at the left hand lower part of Figure 1.

Figure 3:
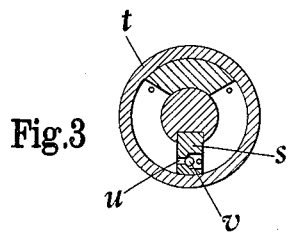
Figure 3 is a vertical transverse sectional view on the line 3—3, Figure 2 of the pump combined with one side of the shock absorber.

I may employ any convenient form of pump $z$. The one shown comprises a small oscillatory vane $s$ (Figures 2 and 3) carried on one end of the spindle of the shock absorber and contained in a cylinder $t$ on the body part of the shock absorber. The vane is provided with a passage $u$ and non-return valve $v$ so that oscillations of the vane accompanying those of the vane of the shock absorber produce transfer of the fluid from the suction to the delivery side of the pump, oil or other liquid being supplied to the pump from the reservoir $q$ and being delivered by the pump to the control valves $g$ of the different shock absorbers, the remainder being returned to the reservoir through the hand controlled valve $p$. It will be seen, therefore, that the valves $g$ are exposed and moved according to a pressure which varies in accordance with the movements of the shock absorber.

The body part of each shock absorber is adapted to be secured to the chassis of the vehicle, and the spindle of the vane is connected to a road wheel axle through the medium of a lever $w$ attached to the outer end of the spindle, relative movement of the said axle and chassis causing the vane to oscillate in the body part.

When the vehicle is in motion, the movements of the chassis relatively to the wheel axles cause the shock absorbers and the pump to be actuated, and action of the absorbers is automatically controlled by the pressure of the fluid displaced by the pump on the valves $g$, the greater the amplitude of movement of the shock absorber vane, the greater is the displacement of the pump and the effect on the controlling valves. This action may further be controlled by the driver through the medium of the valve $p$, opening of the valve $p$ causing a diminution of the action of the pump fluid on the valves $g$ and vice versa.

Figure 4:
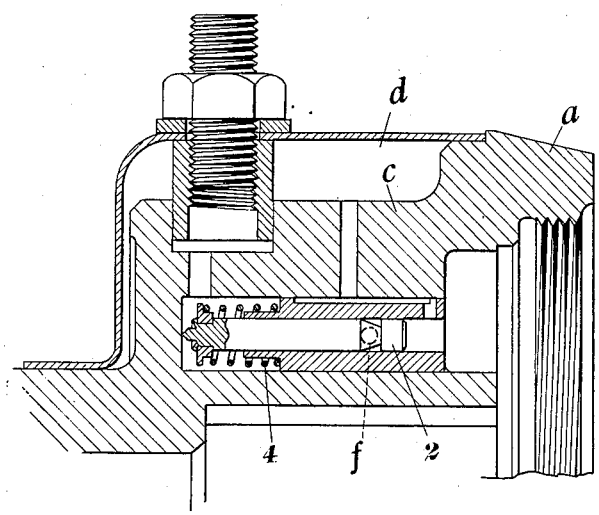
Figure 4 shows to a larger scale than Figures 1 and 2 a modified form of control valve.

In the modified form of control valve shown in Figure 4, this comprises a valve 2 slidable in the abutment $c$. At one end the valve is exposed to the fluid in the replenishing chamber $d$ and at the other end to the pressure fluid supplied by the pump. The valve is moved in one direction by a spring 4, and in the other direction by the pressure of the pump fluid on the left hand end of the valve. An intermediate part of the valve is formed with an annular groove adjacent to a passage $f$ through the abutment, this passage being restricted or opened by axial movement of the valve.

Figure 5:
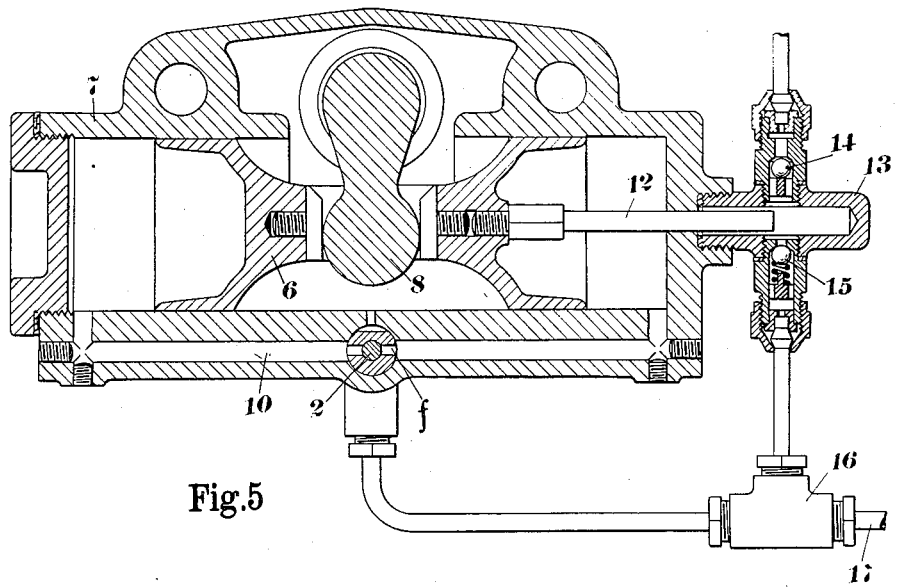
Figures 5 and 6 are respectively a longitudinal section and cross section showing a modified form of shock absorber for use in the system forming the subject of my invention.
Figure 6:
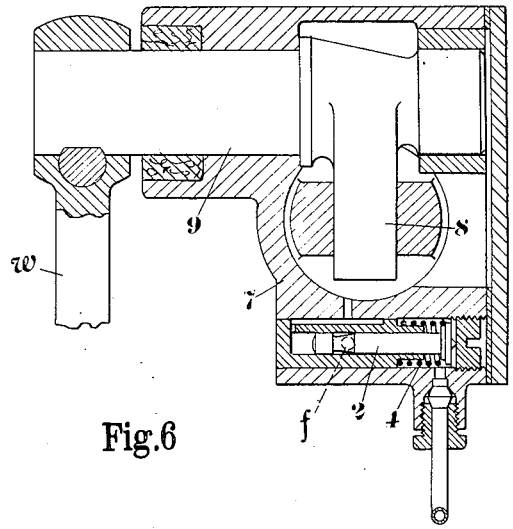

An application of the invention to a shock absorber of the reciprocatory type is shown in Figures 5 and 6. In this example a piston 6 is slidable in a cylinder 7. This piston is reciprocated by a lever 8 on a spindle 9, this latter being connected by a lever w to the wheel axle, and the cylinder to the chassis. The two ends of the cylinder are interconnected by a passage 10 containing a control valve 2 similar to the one shown in Figure 4. Also from one end of the piston extends a pump plunger 12, one end of which is contained in a pump cylinder 13 mounted in the cylinder 7 and provided with an inlet valve 14 and outlet valve 15, the latter communicating with a fitting 16 to which are connected pipes 17 leading to the various control valves. In other respects the system containing this form of shock absorber may be essentially similar to that shown in Figure 1.

My invention is not limited to the examples above described and subordinate mechanical details may be varied to suit different requirements. Further, whilst it is preferable to employ oil or other liquid for actuating the control valves, compressed air may be used.

Having thus described my invention what I claim as new and desire to secure by Letters Patent is:—

1. For use in a fluid controlled shock absorber system for motor vehicles, the combination with a shock absorber having a hollow body part, a relatively movable member contained in and separating spaces in the interior of the body part, a passage interconnecting said spaces, and a fluid operated valve controlling said passage, of a pump having a movable inner part rigid with the movable member of the shock absorber, and means for conducting fluid under pressure from the pump to the control valve, substantially as described.

2. For use in a fluid controlled shock absorber system for motor vehicles, the combination with a shock absorber having a hollow body part, an oscillatory vane contained in and separating spaces in the interior of the body part, a passage interconnecting said spaces, and a fluid operated valve controlling said passage, of a pump having an oscillatory actuating spindle operatively rigid with said vane, a hollow body part, an oscillatory vane contained in said body part and rigid with said spindle, and means for conducting fluid under pressure from the pump to the control valve, substantially as described.

3. For use in a fluid controlled shock absorber system for motor vehicles, the combination with a shock absorber having a hollow body part, a reciprocatory part contained in and separating spaces in the interior of the body part, a passage interconnecting said spaces, and a fluid operated valve controlling said passage, of a pump having a hollow body part, a plunger rigid with the reciprocatory part of the shock absorber and extending into the hollow body part of the pump, and means for conducting fluid under pressure from the pump to the control valve, substantially as described.

HERBERT WINCHESTER PITT.